United States Patent [19]

Haass et al.

[11] 3,716,799
[45] Feb. 13, 1973

[54] CIRCUIT ARRANGEMENT FOR INTERFERENCE-FREE RECOGNITION OF THE ZERO CROSSINGS OF SINE-LIKE SIGNALS

[75] Inventors: Guenther Haass; Dieter Reinhardt, both of Munich, Germany

[73] Assignee: Siemens Aktiengesellschaft, Berlin and Munich, Germany

[22] Filed: April 5, 1971

[21] Appl. No.: 131,353

[30] Foreign Application Priority Data

April 24, 1970 Germany.....................P 20 20 187.0

[52] U.S. Cl..............................328/150, 307/235 R
[51] Int. Cl..........................H03k 5/20, H03k 17/30
[58] Field of Search..............307/235; 328/150, 11 S

[56] References Cited

UNITED STATES PATENTS 3,461,390  8/1969  Mack................................307/235 X
3,480,800  11/1969  Lynes et al. .....................307/235 X

OTHER PUBLICATIONS

L. M. Koch, "Zero–Crossing Detector and Pulse Generator" IBM Technical Disclosure Bulletin, Vol. 12, No. 8, January, 1970, pg. 1,177

Primary Examiner—John Zazworsky
Attorney—Hill, Sherman, Meroni, Gross & Simpson

[57] ABSTRACT

An arrangement for recognizing zero crossings of sine-like signals in the presence of interference utilizes a bistable flip-flop circuit which is capacitively coupled to receive input signals from a differential amplifier having a pair of inputs which are symmetrical with respect to ground. The coupling capacitors and the bias resistors of the flip-flop circuit provide a switching threshold which is smaller during a succession of useful signals and during receipt of individual interference signals. The flip-flop circuit feeds impulse generating means to provide correctly timed, for example, rectangular signals.

2 Claims, 3 Drawing Figures

CIRCUIT ARRANGEMENT FOR INTERFERENCE-FREE RECOGNITION OF THE ZERO CROSSINGS OF SINE-LIKE SIGNALS

DESCRIPTION

This invention relates to a circuit arrangement for recognition of zero crossings of sine-like useful signals of variable amplitude and frequency to produce a timing signal at a zero crossing, and more particularly to such a circuit arrangement which is not responsive to interference signals.

The determination of zero crossings of received signals often poses a problem during the transmission of data. Such a problem may arise, for example, during the sensing of information in a directional timed writing for application onto tapes. In this type of application, a timing signal must be produced at the time at which a sensing signal is present, and this timing signal must be derived from the sensing signal. In a typical installation, information to be recorded on a magnetic tape is received in the form of a succession of generally rectangular signals. This information is sensed by a sensing head to provide a signal track of substantially sinusoidal form which is provided to a differentiating circuit by way of a preamplifier in the formation of timing signals. Sensing pulses are then to be formed during the zero passage of the differentiated signals, which pulses are preferred to have a rectangular shape.

It is the primary object of the present invention to determine the zero crossings of sine-like or sine-shaped signals as accurately as possible.

This objective is realized through the utilization of a differential amplifier which has a pair of inputs to which the information signals are applied. A detector circuit having inputs connected to the outputs of the differential amplifier is provided with a switching threshold which is smaller in the presence of a succession of useful information signals than in the presence of individual interfering signals. The detector circuit provides, on separate outputs, signals which are inverted with respect to one another. These inverted signals are applied to respective inpulse generators to produce correctly timed impulses.

Other objects, features and advantages of the invention, its organization, construction and operation will best be understood by the following detailed description of an exemplary embodiment thereof taken in conjunction with the accompanying drawings, in which.

Figure 1:
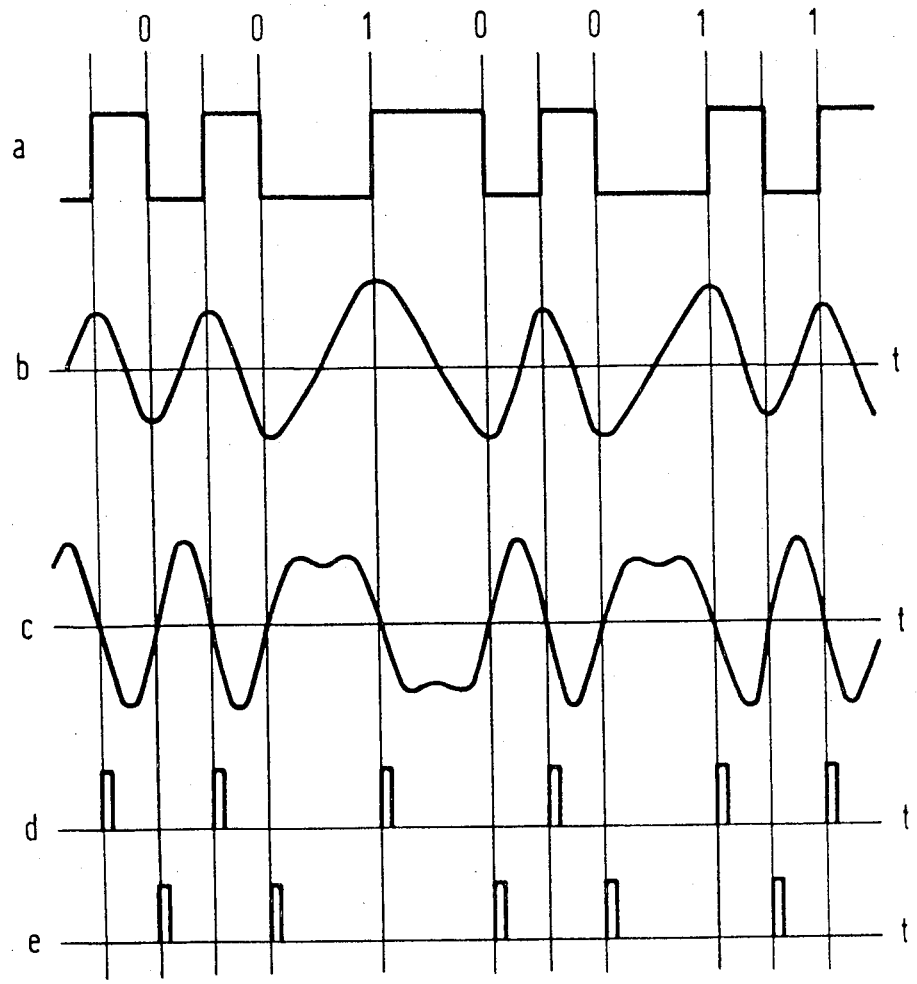
FIG. 1 illustrates a plurality of waveforms normally found in the process of producing timing signals in response to the zero crossings of data signals.

Referring to FIG. 1, the normal process is illustrated by a plurality of waveforms in which line (a) illustrates the information which is to be recorded on a magnetic tape. This information is sensed by a sensing head which produces a signal track corresponding to line (b). The sensing signals are applied to a differentiating circuit by way of a preamplifier and the output signals thereof are illustrated in line (c). Sensing pulses are to be formed from the aforementioned signals during the zero crossings thereof. The sensing impulses are illustrated in lines (d) and (e). These pulses are then further processed by a timing and decoding circuit.

Figure 2:
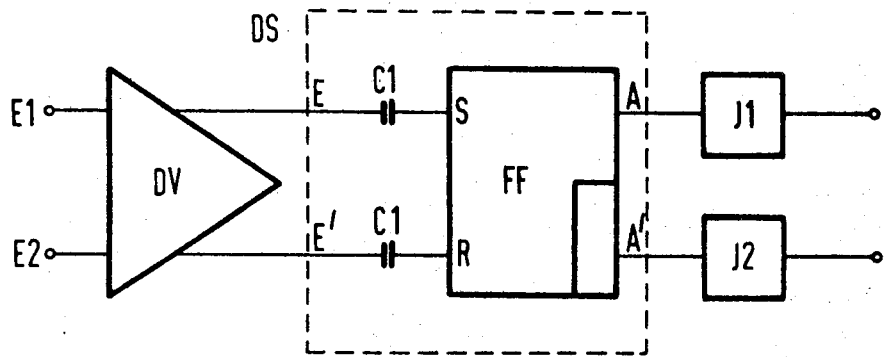
FIG. 2 is a schematic block diagram of a circuit arrangement constructed in accordance with the principles of the present invention.

Referring to FIG. 2, a block diagram of the circuit arrangement according to the present invention is illustrated as comprising a differential amplifier DV, a detector circuit DS and two impulse generators I1 and I2. The information signals whose zero crossings are to be determined, and furthermore interference signals, are supplied to the differential amplifier DV at its inputs E1 and E2. All of these signals, the information and interference signals, may be referred to as input signals. The two outputs of the differential amplifier DV are connected to the detector circuit DS which has a pair of switching thresholds depending on whether a succession of useful signals or individual interfering signals are present as input signals. In the first case, the switching threshold is low so that a useful signal is processed even if it is of low amplitude. In the second case, the switching threshold is high so that even those interfering signals with a larger amplitude do not produce output signals at the detector circuit DS. The two outputs A and A' of the detector circuit DS are provided with output signals which are inverted with respect to one another and are connected to respective impulse producing stages I1 and I2. The timing signals are then provided at the outputs of the stages I1 and I2 and may, for example, be rectangular type pulses.

The detector circuit DS may comprise a bistable flip-flop circuit FF including a set input S which is connected to one of the outputs of the differential amplifier DV by way of a capacitor C1, and with a reset input R which is connected with the other output of the differential amplifier DV via a further condenser C1'.

Figure 3:
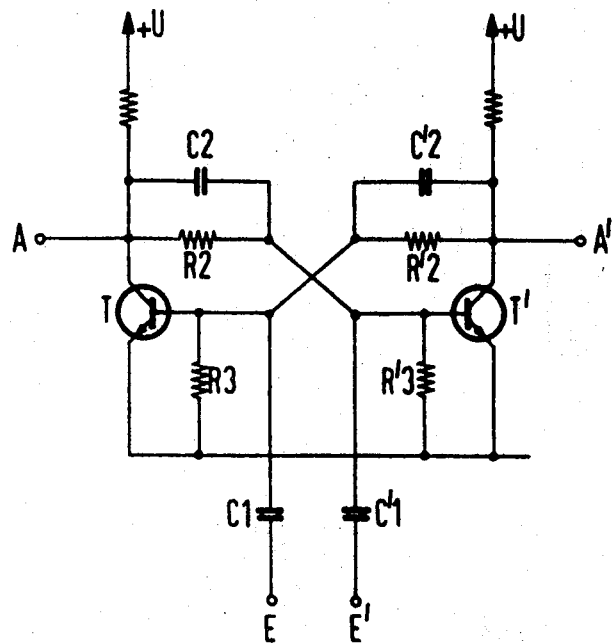
FIG. 3 is a schematic circuit diagram of the detector circuit of FIG. 2 specifically illustrating a flip-flop circuit which is adapted to receive input signals by way of coupling capacitors.

In FIG. 3, an embodiment of a bistable flip-flop circuit FF is illustrated which is of a type well known in the art except for the provision of the capacitors C1, C1'. Inasmuch as this type of flip-flop circuit is common, it will not be described in detail herein. It has been assumed, for example, that the transistor T is conductive and the transistor T' is blocked. Thus, a voltage which corresponds substantially to the supply voltage U, is available at the collector of the transistor T'. A positive voltage is provided to the base of the transistor T by way of a voltage divider circuit R2', R3, so that the transistor T remains conductive and that a voltage of, for example, about 0.7 volts, is provided at its base. (This is the remaining voltage of the base-emitter diode of the conductive transistor). This direct voltage is also applied to the capacitor C1 at the upper terminal illustrated in the drawing and which is connected to the flip-flop circuit FF. The base of the transistor T' is kept at approximately 0 volts by a voltage divider circuit R2, R3'. The transistor T' remains blocked and the condenser C1' is dc-wise also at zero volts at the terminal thereof which is connected to the base of the transistor T' of the flip-flop circuit FF.

The interferences which arrive by way of the signal lines can flip the bistable flip-flop circuit FF only under certain conditions. If one proceeds from the fact that no interfering signals are coupled in on the lines between the differential amplifier DV and the bistable flip-flop circuit FF, two kinds of interferences can be differentiated:

1. All interfering signals which are coupled in-phase into the ground-symmetrical signal lines at the input of the differential amplifier DV are eliminated by the push-push suppression of the differential amplifier DV. The bistable flip-flop circuit FF therefore cannot be controlled on both inputs simultaneously with setting or resetting pulses of equal polarity.

2. Coupled-in interferences on only one of the signal lines just like interferences which are coupled in-phase and in opposition on both inputs, cause in-phase opposed interfering signals at the outputs of the differential amplifier DV. These interfering signals, however, can only then flip the bistable flip-flop circuit FF when they appear at the output of the differential amplifier DV as positive pulses which are applied to the blocked transistor of the bistable flip-flop circuit FF. Furthermore, the interference must exceed the switching threshold of the bistable flip-flop circuit which is, for example, 0.7 volts.

A block of information which is recorded on a magnetic tape comprises the signal succession itself and a succession of synchronization signals preceding and following the information signals. These synchronization signals exceed the switching threshold, for example 0.7 volts, several times so that the following recorded information can safely be recognized. If the switching threshold is exceeded several times, not the 0 and 0.7 volts, but an average dc value of about 0.35 volts occurs at the base connected terminals of the capacitors C1 and C1' due to the repeated flipping process. In order to further flip the bistable flip-flop circuit FF, the sensing signal now only requires an amplitude of somewhat more than 0.35 volts, i.e. the switching threshold of the circuit is smaller during the time in which the useful signal is applied than during a transmission break. The two switching thresholds may be adjusted with respect to the desired amplitude in values of percentage thereof by the magnitude of the reaction (feedback) resistors R2 and R2' of the bistable flip-flop circuit FF. The capacitor C2 and C2' compensate the input capacitances of the transistors T and T' of the bistable flip-flop circuit FF.

When input signals are applied, there are two in-phase and opposed rectangular oscillations available which have their flanks at the time locations of the zero crossings of the input signals. In further processing, these flanks can be applied to an impulse generator such as a differentiating member or a monostable multivibrator circuit.

The circuit arrangement according to this invention has the following advantages:

1. The switching threshold of the circuit arrangement is independent of the signal frequency in the operational range. Signal successions of various frequencies, thus also the sensing signals of tape recorders of different tape speeds, can be processed.

2. The exact times at which the timing signals are provided do not depend on the amplitude of the input signals. Therefore, input signals which are a few percent of the desired amplitude will still be evaluated correctly.

3. The circuit arrangement does not react to interference impulses during a transmission break while no useful signals are applied to the input; therefore, no false timing pulses are produced.

4. The timing pulses may have a constant width and flank steepness.

5. The circuit arrangement may be provided at a low cost.

Although we have disclosed our invention herein by reference to a specific illustrative embodiment thereof, many changes and modifications may become apparent to those skilled in the art without departing from the spirit and scope of our invention, and it is to be understood that we intend to include within the patent warranted hereon, all such changes and modifications as may reasonably and properly be included within the scope of our contribution to the art.

What we claim is:

1. A circuit arrangement for interference-free recognition of zero crossings of sine-like useful signals of varying amplitude and frequency, preceded by a succession of synchronizing pulses, for producing a timing signal in response to a zero crossing, comprising: a differential amplifier including a pair of inputs for receiving said synchronizing pulses and said sine-like signals and a pair of outputs; a detector circuit including a pair of inputs connected to respective ones of the outputs of said differential amplifier, a pair of outputs, and means for establishing a switching threshold in response to said synchronizing pulses which is smaller in the presence of a succession of useful signals than in the presence of individual interference signals, said detector circuit operable to provide timing pulses at said detector circuit outputs in response to the zero crossings of a signal applied to the inputs of said differential amplifier during the lower switching threshold; and a pair of pulse generators connected to respective ones of the outputs of said detector circuit.

2. The circuit arrangement according to claim 1, wherein said detector circuit comprises a bistable flip-flop circuit having a set input and a reset input, a first capacitor connected between said set input and one of said outputs of said differential amplifier and a second capacitor connected between said rest input and the other of said outputs of said differential amplifier.

* * * * *